US007254401B2

(12) United States Patent
Keränen et al.

(10) Patent No.: US 7,254,401 B2
(45) Date of Patent: Aug. 7, 2007

(54) NETWORK-BASED METHOD AND SYSTEM FOR DETERMINING A LOCATION OF USER EQUIPMENT IN CDMA NETWORKS

(75) Inventors: Yrjö Keränen, Ylikiiminki (FI); Timo Viero, Espoo (FI)

(73) Assignee: Nokia Corporation, Espoo (FI)

( * ) Notice: Subject to any disclaimer, the term of this patent is extended or adjusted under 35 U.S.C. 154(b) by 1190 days.

(21) Appl. No.: 09/740,299

(22) Filed: Dec. 19, 2000

(65) Prior Publication Data

US 2002/0094820 A1  Jul. 18, 2002

(51) Int. Cl.
*H04Q 7/20* (2006.01)
*G01S 13/00* (2006.01)

(52) U.S. Cl. ..................... 455/456.1; 342/88
(58) Field of Classification Search .................. 455/67, 455/423, 456.1, 500, 517, 67.1, 67.6, 450, 455/466, 457, 458, 456.2, 450.1; 342/47, 342/88, 95, 125, 126, 140, 133, 139, 357.1, 342/357.06, 357.08, 357.01, 450, 458, 357.6
See application file for complete search history.

(56) References Cited

U.S. PATENT DOCUMENTS 5,736,964 A     4/1998  Ghosh et al. ............... 342/457
5,943,014 A *   8/1999  Gilhousen .................... 342/465
6,011,974 A     1/2000  Cedervall et al. ........... 455/456
6,052,363 A *   4/2000  Koch .......................... 370/252
6,195,046 B1*   2/2001  Gilhousen ................... 342/457
6,477,380 B1*  11/2002  Uehara et al. ........... 455/456.1
6,633,559 B1*  10/2003  Asokan et al. .............. 370/350
6,665,332 B1*  12/2003  Carlson et al. ............. 375/130
6,681,099 B1*   1/2004  Keranen et al. ......... 455/67.16
2002/0068567 A1*  6/2002  Johansson ................... 455/436
2002/0086682 A1*  7/2002  Naghian ..................... 455/456
2006/0003775 A1*  1/2006  Bull et al. ............... 455/456.1

FOREIGN PATENT DOCUMENTS

EP        0 933 961 A2    4/1998
WO        WO 98/01768      1/1998

\* cited by examiner

*Primary Examiner*—Melody Mehrpour
(74) *Attorney, Agent, or Firm*—Harrington & Smith, LLP (57) ABSTRACT

A method and system for determining a location of a user equipment using RTT measurements from a connected node B and RTT measurement of other node Bs which are not connected to the user equipment. The radio network controller of a network measures RTT of a connected node Bs and then measures RTT of non connected node Bs. Based on the RTT measurement, the distances of the user equipment from each node B is determined. Circles having radii equal to the distances of the user equipment from the nodes are used to determine the user equipment location.

20 Claims, 7 Drawing Sheets

NETWORK-BASED METHOD AND SYSTEM FOR DETERMINING A LOCATION OF USER EQUIPMENT IN CDMA NETWORKS

BACKGROUND OF THE INVENTION

1. Field of the Invention

The present invention relates to determination of a location of user equipment in a third generation wideband code division multiple access network.

2. Description of the Related Art

Third Generation (3G) mobile communication systems include LoCation Services (LCSs) which measure radio signals to determine the geographic location of a User Equipment (UE). The location information may be requested by and reported to a client and/or application associated with the UE or an external client in the Core Network (CN) of the 3G mobile communication system. Furthermore, the location information is also used by the Universal Terrestrial Radio Access Network (UTRAN) of the 3G mobile communication system to facilitate location assisted handovers or to support other features, such as home location billing.

The LCSs for 3G mobile communication systems are based on methods that have been used for the Global System for Mobile Communication (GSM) which include Time of Arrival (TOA), Observed Time Difference of Arrival (OTDOA), and Global Positioning System (GPS). These positioning methods are described in technical specification GSM 03.71, version 7.2.1. The TOA method comprises transmitting a signal from a UE and measuring the time of arrival of the signal at three or more measurement units. The difference in times of arrival is determined by pair-wise subtraction of the measured times of arrival. The mobile position may then be calculated via hyperbolic trilateration. However, to determine the actual time differences, the real time difference (RTD) between the three measurement units must be known or determined.

The OTDOA method of LCS measures the difference in time of arrival at the UE of the signals from several nodes or Base Station Transceivers (BTSs). This method also requires that the RTD between the BTSs be determined. The determination of the RTD for both the TOA and OTDOA methods of LCS is complex and therefore reduces the efficiency of the system.

However, the GPS assisted method of location requires that the UE have a GPS receiver. This requirement thus adds both bulk and cost to the UE.

Figure 8:
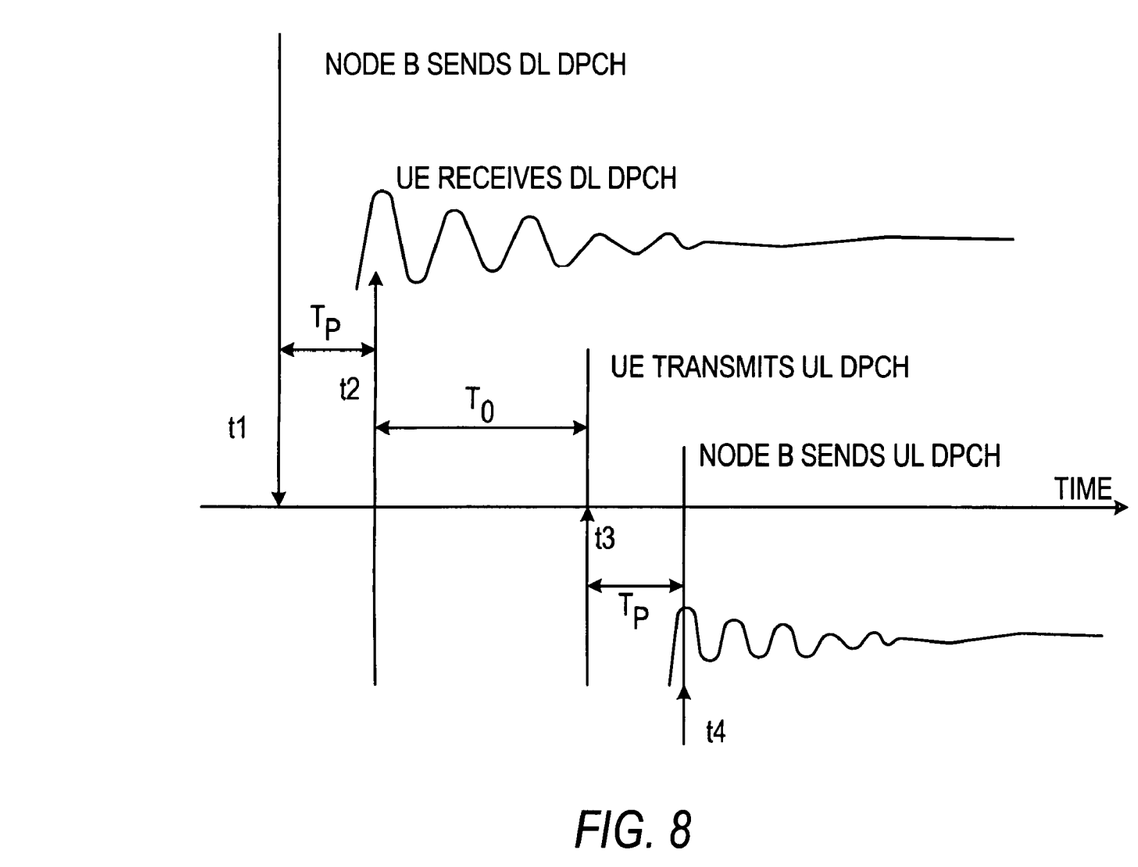
FIG. 8 is a timing diagram showing the propagation delays and the transmission timing delay of the round trip time of a signal transmitted from a transceiver node to a user equipment and back.

Another method for determining a geographic location of the UE in a 3G wireless network includes measuring a round trip time (RTT) between the UE and at least three radio transmission nodes of the wireless network. The RTT is the time required for a downlink (DL) transmission from a node to a UE to the reception of an uplink (UL) transmission at the node from the UE in response to the DL transmission. FIG. 8 illustrates the RTT. At time t1 a node-B of a wireless network begins transmission of a DL transmission in a dedicated physical channel (DPCH) path. The node-B is a logical node responsible for radio transmission and/or reception in one or more cells with the UE and is similar in function to a Base Transceiver Station (BTS) in GSM. It will be generically referred to as a transceiver node in the following discussion. The DL transmission is received by the UE at time t2, which is a one-way propagation delay $T_p$ after the time t1. After the passage of time equal to a nominal transmission timing delay $T_0$, the UE begins transmission of a UL transmission in the DPCH path at time t3 in response to the DL transmission. After another one-way propagation delay $T_p$, the transceiver node receives the UL transmission at time t4. Therefore, the RTT comprises a first one-way propagation delay, the UE reception to transmission time delay (UE Rx-Tx) (also referred to as a transmission timing delay), and a second one-way propagation delay or $RTT=T_p+T_0+T_p$. The nominal value of the transmission timing delay $T_0$ is defined as a constant value of 1024 chips. A chip is the longest duration of a spread spectrum signal in which signal parameters are approximately constant, i.e. the duration of time of the most elemental component of a spread spectrum signal when it is decompressed in time.

An RTT measured by a transceiver node in a 3G mobile communication system is roughly defined by the time difference between t1 and t4. Since the nominal value of the transmission timing delay or DL-UL timing offset $T_0$ at the UE (t3-t2) is known, the round trip propagation delay (RTPD), which equals $2T_p$ can be calculated by subtracting To from the RTT. Since RTPD is related to the distance (i.e., time x velocity), the location of the UE can be estimated if the UE is connected to three or more nodes of the UTRAN whose locations are known.

However, in a 3G network, the transmission timing difference, which is the time between reception of the DL transmission at the UE and transmission of the UL transmission from the UE (i.e., t3-t2), is not a fixed time period and may be different from the nominal transmission timing delay $T_0$ when (1) the UE is moving relatively fast (i.e., an automobile at highway speed) toward or away from the BTS, (2) the propagation paths vary, and (3) there is, or has been, a soft handover of the UE from one cell to another. Accordingly, a geographic location based on the RTT using the nominal transmission timing delay $T_0$ can be significantly inaccurate (the maximum inaccuracy in a location is typically greater than a cell radius).

The inaccuracy in determining the propagation delay associated with the RTT measurements caused by the difference between the actual transmission timing delay and the nominal transmission timing delay To may be corrected by separately measuring the RTT for each cell in active communication with the UE. This prior art method eliminates the requirement for determining the real time difference (RTD) between the various nodes used for measurement. However, it requires more than one transceiver node in active communication with the UE, i.e., connected to the UE.

SUMMARY OF THE INVENTION

The present invention is directed to a method and system for determining a geographic location of a user equipment via a location service server in a wireless network. The location of the user equipment may be required by the network for performing an operation on the user equipment such as a hand-off operation or a directional transmission and for providing information to the user relative to the surrounding environment, i.e., locations of nearby restaurants, tourist attractions, hospitals, or other places of interest, and advertisements and other information of nearby businesses and attractions. The method according to the present invention first receives a request for a user equipment location from a user equipment, a client of the core network, or the core network itself. In response to the request, a Radio Network Controller (RNC) determines a value of the transmission timing difference of the user equipment. This may be accomplished by querying the user equipment to ascertain the actual transmission timing difference or assuming that the transmission timing difference is a nominal or default value. After the transmission timing difference is determined, a round trip time (RTT) is measured for a connected transceiver node which is in active communication with the user equipment. After that, a round trip time is determined for at least one other transceiver node which is not connected to the user equipment. After the RTTs are determined, the distance of the user equipment from each transceiver node is calculated using the transmission timing difference previously determined and using the RTT measurements. After each distance is determined, the location of the UE can be calculated therefrom.

If the user equipment is idle when the location request is initiated, the RNC will initiate a connection between the user equipment and a selected transceiver node, wherein the selected transceiver node becomes the connected transceiver node after successful connection with the user equipment. The RNC may initiate a connection between the selected transceiver node and the user equipment by requesting a return trip time measurement via a random access channel to connect the user equipment to the selected transceiver node.

The user equipment location may be determined by mathematically generating a circle around the connected transceiver node and the at least two other transceiver nodes which are not connected with the UE, wherein the radius of each circle is the distance of the user equipment to the respective transceiver node. Once the circles are generated, the user equipment location is determined to be the intersection point of the circles.

If the transmission timing delay is assumed to be the default value $T_0$, the actual transmission timing delay may be different, which results in the calculated distance being either too large or too small. If it is determined that the circles around the transceiver nodes do not intersect at a point because the radii of the circles is too small, the intersection point of the circles is determined by iteratively increasing the radii of the circles until an intersection point is determined. If it is determined that the circles do not intersect because they overlap, i.e., the circles intersect in a common area instead of a common point, the intersection of the circles is determined by iteratively decreasing the radii of the circles until an intersection point is determined.

Instead of using the intersection of circles which requires at least three transceiver nodes, the user equipment location may also be determined using the Angle of Arrival (AOA) method. In this embodiment, a circle is generated around the connected transceiver node and another transceiver node corresponding to the distance of the user equipment therefrom. Furthermore, the angle of arrival of the radio signals from the user equipment is determined for the connected transceiver node and the other transceiver node. The intersection of the two circles which falls within the angle of arrival of the two transceiver nodes is determined to be the location of the user equipment.

When measuring the RTT of the connected transceiver node, the angle of arrival may be used to determine the sector of the connected transceiver node in which the user equipment is located. The additional transceiver nodes which are not connected to the user equipment may, by applying basic geometry, use the knowledge of the sector to determine where to search for the UE for measuring the RTT.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
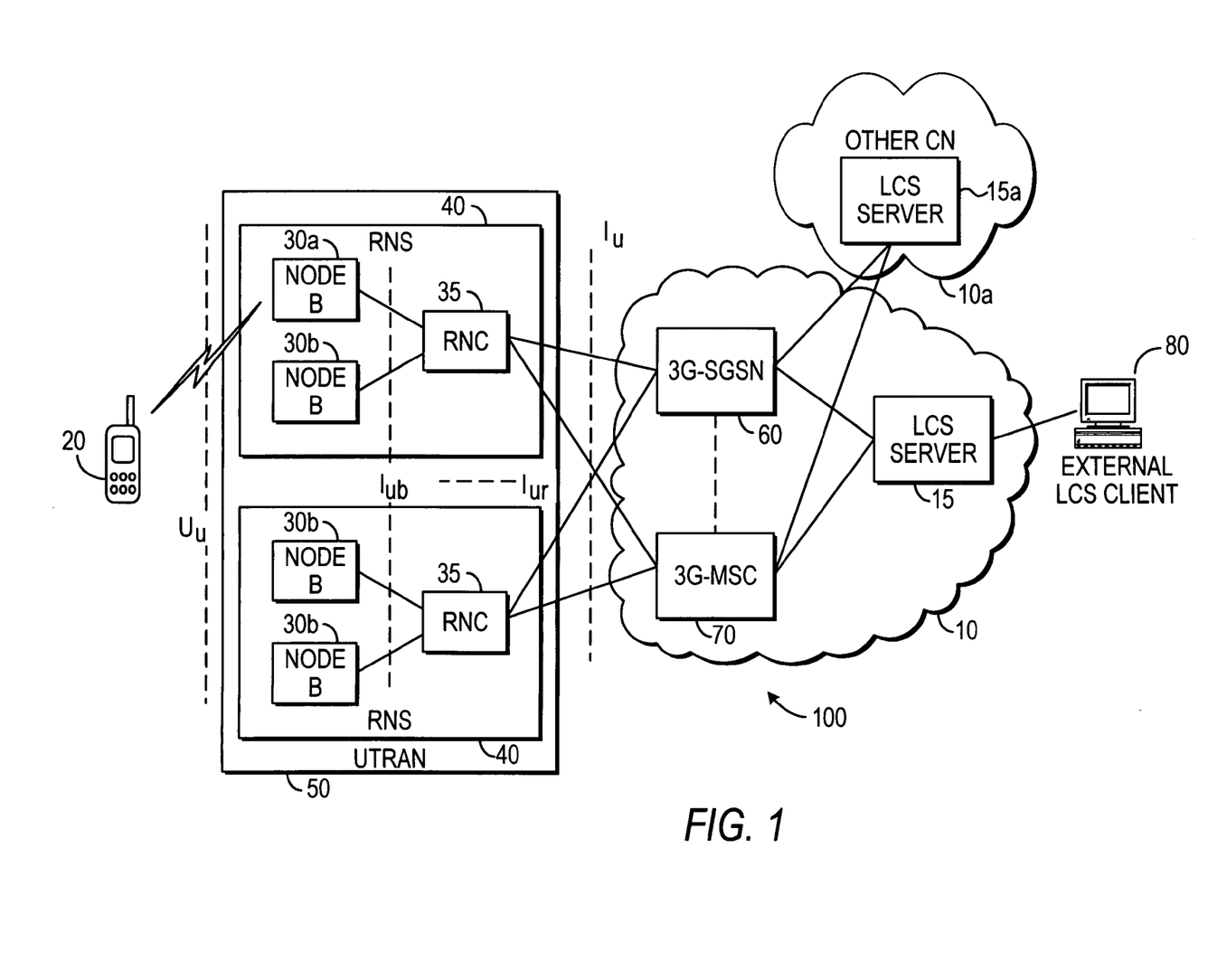
FIG. 1 is a schematic diagram of a third generation mobile communication system having a Location Service Server.

A Third Generation (3G) mobile communication system 100 for performing the method according to the present invention is shown in FIG. 1. The 3G mobile communication system 100 comprises a Core Network (CN) 10 with a LoCation Service (LCS) server 15 for providing location information about a User Equipment (UE) 20 within the geographical area covered by the CN 10. The UE 20 is a mobile equipment with one or several Universal Mobile Telephone System (UMTS) Subscriber Identity Module(s). The UE 20 may comprise a mobile phone, person digital assistant (PDA), a wearable computer, a device based on WAP technology, or any other mobile device capable of wireless communication. A plurality of Radio Network Subsystems (RNSs) 40 are operatively connected with the CN 10. Each RNS 40 comprises a plurality of transceiver nodes 30*a*, 30*b*. Each transceiver node 30 comprises a node-B, which is a logical node for radio communication with the UE 20 in one or more cells within a geographical transmission range of that node-B. The node-B is similar in function to a Base Transceiver Station (BTS) in GSM. Each RNS 40 also has one or more Radio Network Controllers (RNCs) 35. Each RNC 35 is connected to one or more of the transceiver nodes 30 for controlling the use and integrity of the radio resources. The RNSs 40 together are referred to as a Universal Terrestrial Radio Access Network (UTRAN) 50. The CN 10 also comprises a 3G Serving GPRS Support Node (SGSN) 60 for data transmission and a 3G Mobile Services Switching Center (MSC) 70 for voice transmission.

The LCS server 15 determines location information and reports the information to a client or an application associated with the UE 20 or an external client 80 connected to the CN 10 of the 3G mobile communication system 100. The location information may also be used by the UTRAN 50 of the 3G mobile communication system to facilitate location assisted handovers and/or to support other features such as home location billing. Furthermore, the location information may also be required to facilitate direct beaming of communication signals to the UE 20.

In the preferred embodiment of the present invention, the LCS server 15 determines the Round Trip Time (RTT) between the UE 20 and a connected transceiver node 30a which is in active communication with the UE, for example, via a dedicated physical channel (DPCH) path and the RTT between the UE 20 and non connected transceiver nodes 30b. This may be done by transmitting a predetermined frame in a downlink (DL) transmission to the UE from the connected transceiver node 30a to which the UE responds with a predetermined frame in an uplink (UL) transmission.

As shown in FIG. 8, the RTT comprises a one-way propagation delay $T_p$, the transmission timing delay $T_0$, and a second one-way propagation delay $T_p$. Since the length of the propagation delays $T_p$ of the DL and UL transmissions are related to distance of the UE 20 from the nodes 30 (i.e., distance=time x velocity), the distance of a UE 20 from the connected node 30 may be determined from the RTT if the transmission timing difference is known where, as discussed above, $2T_p$=RTT−transmission timing delay.

The CN provides information regarding the UE 20 to other transceiver nodes 30b which are not connected to the UE 20. Using the information, the non-connected nodes 30b search for the UE 20 and receive the UL transmissions that the UE 20 sends to the connected transceiver node 30a. Using the time-of-arrival of the UL transmissions and comparing the time-of-arrival at the connected transceiver node, the distance of the UE 20 from these other transceiver nodes 30b is determined. When the distance of the UE 20 from the connected node 30 and at least two other nodes is determined, and the positions of those three nodes are known, the position of the UE 20 may be determined by calculating the intersection of circles around the three known locations of the transceiver nodes 30a, 30b, wherein the radii of the three circles are the distances from the respective transceiver nodes.

The LCS server 15 may be located anywhere in the network and may be incorporated in other portions such as the RNCs 35 or RNSs 40. Furthermore, an LCS server 15a located in another CN 10a may also request RTT measurements.

Figure 2:
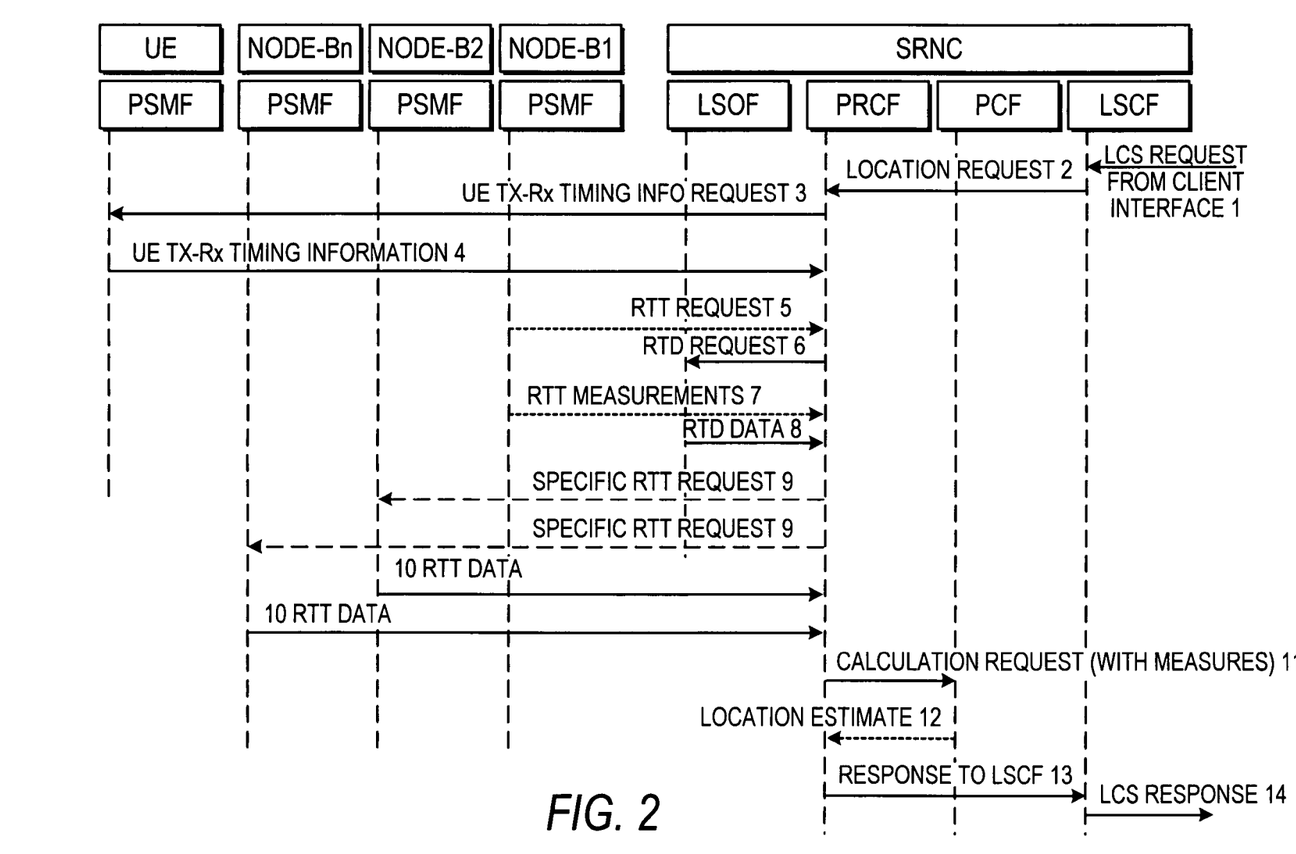
FIG. 2 is a signal flow diagram for a method of locating a user equipment according to an embodiment of the present invention.
Figure 3:
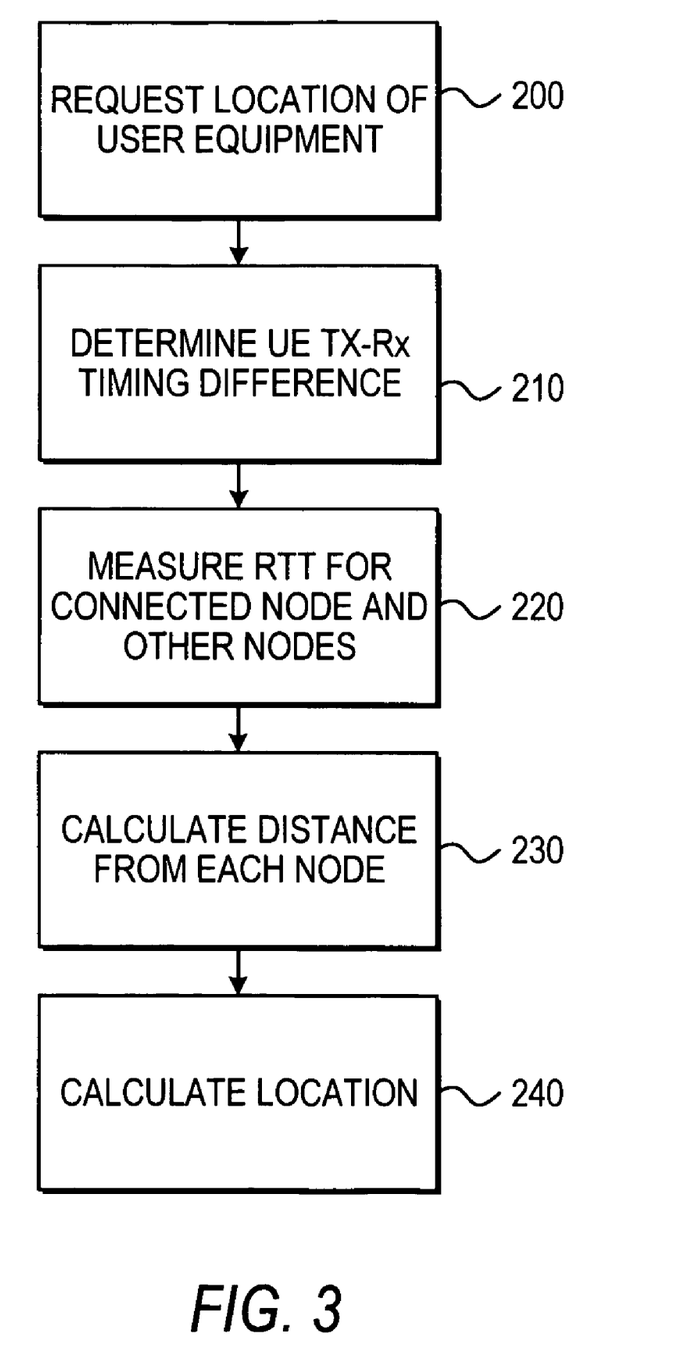
FIG. 3 is a flow diagram showing the steps for locating a user equipment according to the present invention.

FIG. 2 is a signal flow diagram and FIG. 3 is a flow diagram depicting the steps required for determining the location of a UE by measuring the RTT of at least three different transceiver nodes in which the UE is connected only to the connected transceiver node 30a. At step 200, a request for locating a user equipment is initiated. This may be performed by the user equipment, a client of the core network, or the core network itself to aid in performing an operation on the user equipment such as a hand-off operation or a directional transmission. The request is received at the serving RNC 35 and addressed by a location system control function (LSCF) thereof. In response to the request, the RNC 35 determines the transmission timing delay information, step 210. This may be accomplished by transmitting a request from the RNC 35 to the UE 20 via a position radio coordination function (PRCF) of the RNC 35. The position signal measurement function (PSMF) of the UE 20 responds by sending the transmission timing delay.

Once the transmission timing difference is determined, RTT measurements from the UE 20 to the connected transceiver node 30a and neighboring transceiver node 30b are performed, step 220. The RNC 35 sends a request for an RTT measurement to the connected transceiver node 30a that is in active communication with the UE 20. The RNC 35 also determines the relative timing difference (RTD) between neighboring transceiver nodes 30b from the location system operations function (LSOF). The PRCF of the RNC 35 collects the RTT information from the connected transceiver node 30a and the RTD information.

The RNC 35 then requests specific RTT data from other neighboring transceiver nodes 30b that are not connected to the UE 20. The neighboring transceiver nodes 30b which are not connected to the UE 20 have knowledge of the parameters of the UE 20 from the RNC 35 and can receive the RTT data which is sent via a UL transmission to the connected transceiver node 30a. The RTT data received by the non-connected transceiver nodes 30b and the RTD data is used to determine the propagation delay for each of the transceiver nodes 30b that are not connected to the UE. The propagation delay may be determined from the RTT data using the transmission timing delay.

A calculation request with the measured values is transmitted from the PRCF of the RNC 35 to the Position Calculation Function (PCF) of the RNC 35. The distance of the UE from each node may be determined from the propagation delay (i.e., distance =velocity×time), step 230. The distance of the UE 20 from each of the transceiver nodes 30a, 30b is used to mathematically generate a circle around each of the transceiver nodes 30a, 30b, wherein the radius of the circle is the distance of the UE from each of the respective transceiver nodes. The UE location may then be calculated by determining the intersection of the circles, step 240. The result of the UE location calculation is transmitted from the PCF to the PRCF. From there, the result is transmitted to the LSCF and onto the requestor.

The step of measuring the RTT, step 220, may be accomplished by transmitting a frame in a downlink (DL) transmission from the connected node B specifically for measuring the RTT. The UE then sends an uplink (UL) transmission in reply. Alternatively, the RTT may be measured during a DL transmission for another function, such as, for example, signals related to cell selection, cell reselection, and/or cell monitoring, thereby reducing the number of required transmissions. Furthermore, the RTT may be measured on a periodic basis, wherein the latest RTT measurement is used for determining the geographic location of the UE. The transceiver nodes 30b which are not connected to the UE receive the UL transmission of the UE because SRNC has transmitted the parameters of the UE to the non-connected transceiver nodes so that they recognize the UL transmission.

Figure 4:
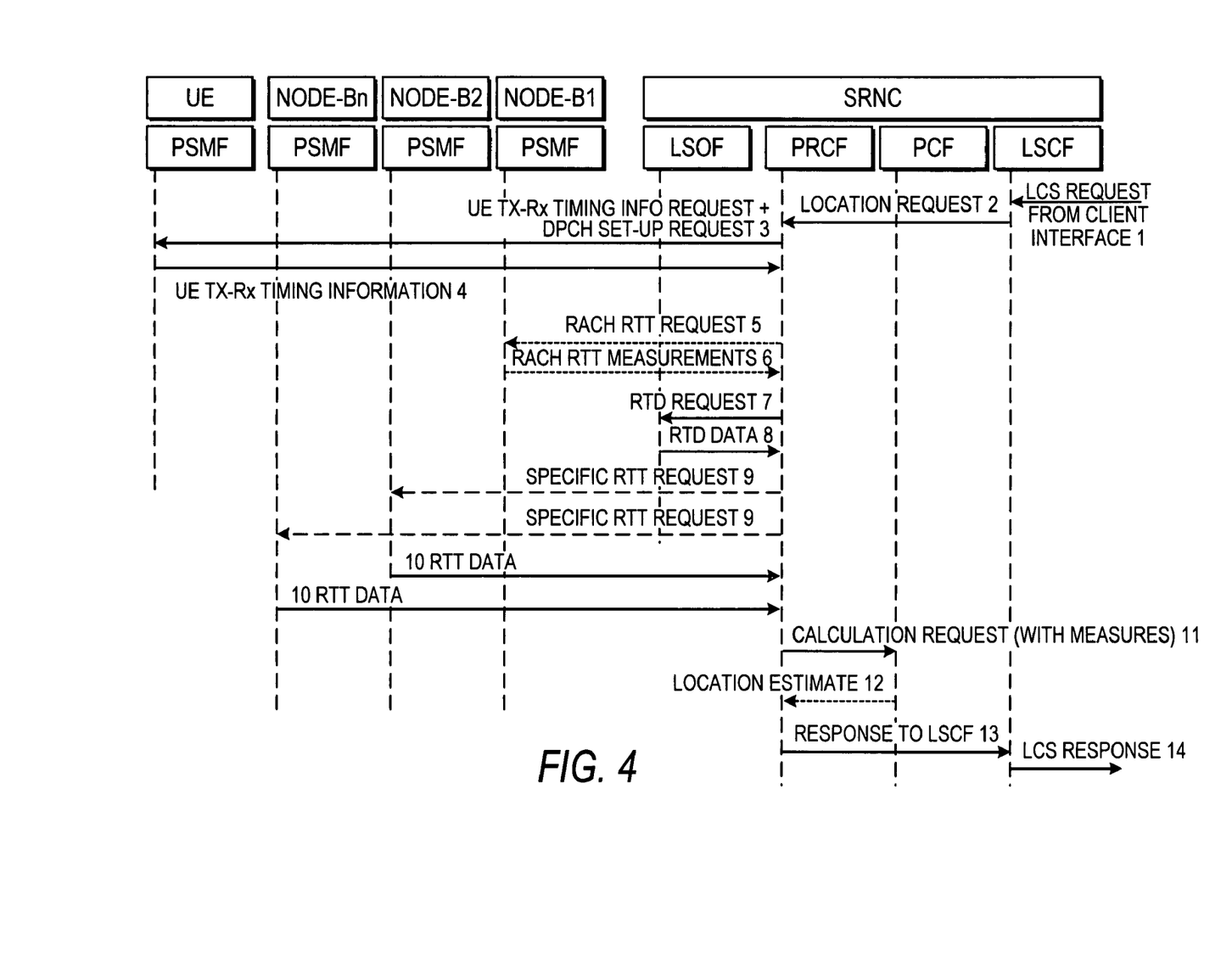
FIG. 4 is a signal flow diagram for a method of locating a user equipment according to another embodiment of the present invention.

If no transceiver node is currently connected to the UE, the RNC 35 may request a dedicated physical channel (DPCH) set-up request along with the transmission timing delay at step 210. FIG. 4 is a signal flow diagram of this embodiment. In this embodiment, the UE 20 is required to start signaling in a random access channel (RACH). The transceiver node that the UE tries to connect to becomes the connected transceiver node 30a and measures the RTT from the RACH signaling. In this phase the transmission timing delay does not deviate from its nominal value. A DPCH path is established between the UE 20 and the connected transceiver node 30a through the RACH signaling. As in the previously described embodiment, the neighboring RTTs are asked to perform RTT measurements.

Figure 5A:
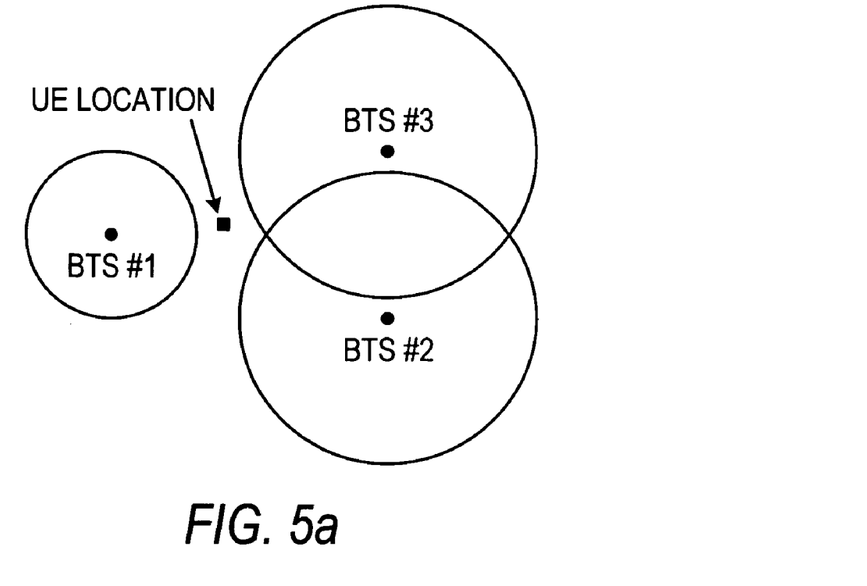
FIG. 5a is a schematic diagram showing distance estimates that are too small.
Figure 5B:
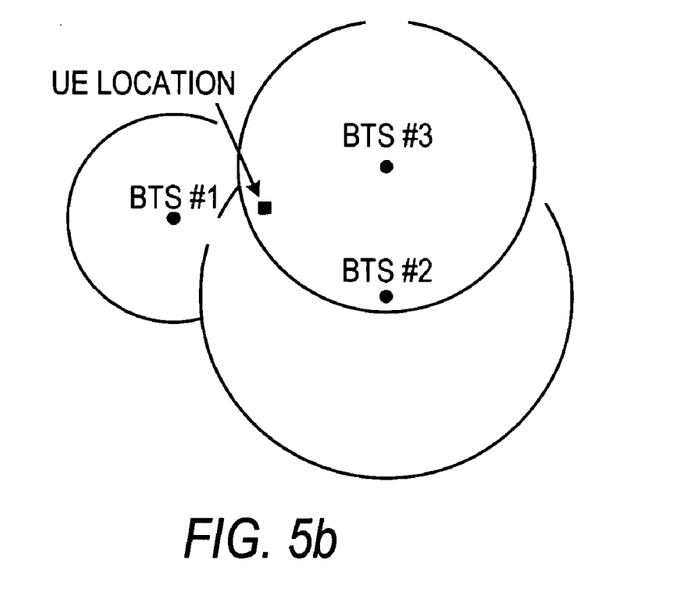
FIG. 5b is a schematic diagram showing distance estimates from node Bs that are too large.

Instead of measuring the transmission timing delay in step 210 of the process, the nominal or default value $T_0$ is assumed. This alternative embodiment assumes that all RTT measurements are performed at the same time instant and, therefore, that the transmission timing delays are equivalent for all RTT measurements. If the actual Tx-Rx timing difference is less than or greater than $T_0$, the propagation delay estimate will be too small or too large. FIG. 5a depicts the estimated propagation delays (PDs) when the estimate is too small and FIG. 5b shows the estimated PDs when the estimate is too large. If the estimated distance around the cell of the nodes 30 based on the PD is too small as in FIG. 5a, the position calculation function of the CN 10 detects that the circles do not intersect at all. In this case, the location of the UE can be determined by iteratively increasing the radiuses of all circles by the same amount until they intersect. When the estimated distance around the cell of the nodes 30 based on the PD is too large as in FIG. 5b, the position calculation function of the network detects that the circles overlap. In the situation shown in FIG. 5b, the locations of the UE is determined by iteratively decreasing the radiuses of all the circles by the same amount until they intersect at one point.

The determination of the propagation delay and the distance of the UE from a connected transceiver node and at least one non-connected transceiver node may be used with any location method for determining a location of a UE such as, for example, observed time difference on arrival (OTDOA), angle of arrival (AOA), observed time of arrival (OTOA), and any method listed in Technical Specifications of the 3rd Generation Partnership Project.

Figure 6:
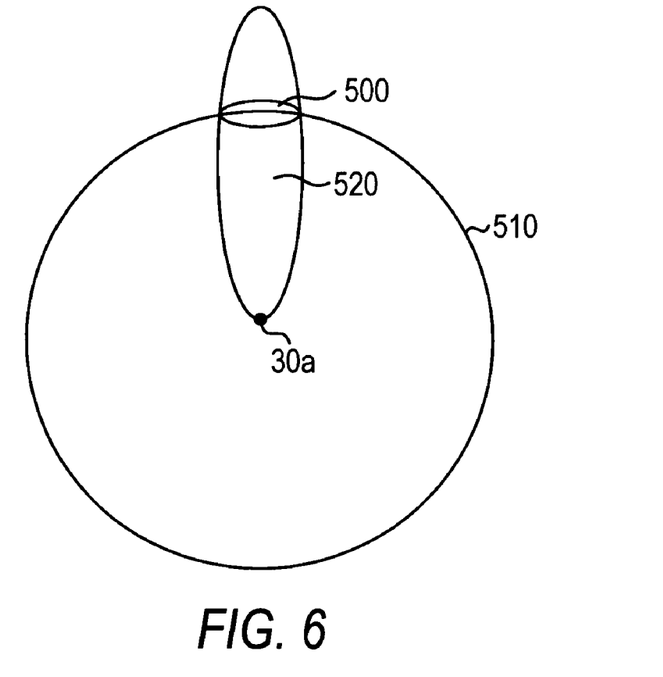
FIG. 6 is a schematic diagram showing the measurements used for determining a location of a UE using one RTT measurement and an AOA measurement.
Figure 7:
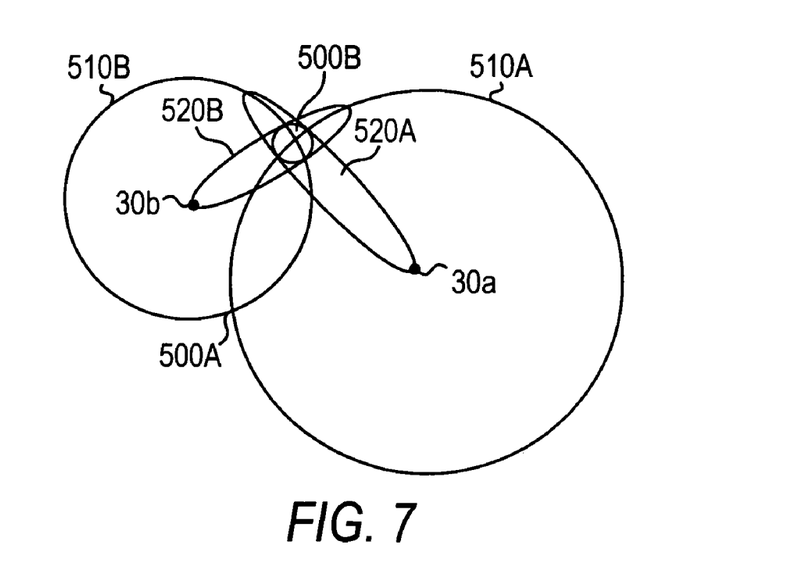
FIG. 7 is a schematic diagram showing the measurements used for determining a location of a UE using two RTT measurements and two AOA measurements.

For example, if only one or two transceiver nodes are available for performing RTT measurements, Angle of Arrival (AOA) information may be used to determine the UE location. AOA information may be measured as described in technical specification 3G TS 25.305, version 3.1.0. Regarding the gathering of AOA information, each transceiver node typically has several sectors and each UE is connected to a single or several sectors, from a list of active sectors, the transceiver node can obtain a rough AOA estimate. For example, if a transceiver node has three sectors, each sector covers 120 degrees of the total 360 degrees around an antenna. The use of a smart antenna may narrow the angle estimate. Referring to FIG. 6, a location estimate 500 for a UE 20 may be computed using a distance determined via RTT measurement to determine a radius 510 around a transceiver node 30a and an AOA measurement 520 at the connected transceiver node 30a. The accuracy of the location estimate 500 using this method is subject to the accuracy of AOA measurement 520. FIG. 7 shows a location estimate using two transceiver nodes. If the two transceiver nodes 30a, 30b use only distance measurements, the UE 20 may be located either of the intersections 500A, 500B of the two circles 510A, 510B. The AOA information 520A, 520B allows the proper UE location to be determined. The situation shown in FIG. 7 in which two transceiver nodes 30a, 30b are in contact with the UE may occur when one of the transceiver nodes 30a is connected to the UE and the other is not connected, as described above. Therefore, the location estimation using true RTT and AOA information from two transceiver nodes may be readily used in WCDMA networks without additional communication traffic.

In a further embodiment related to the embodiment shown in FIGS. 2 and 3, the connected transceiver node 30a may determine a sector of the connected transceiver node in which the UE 20 is located. Once this is determined the RNC 35 provides this information to the transceiver nodes 30b which are not connected so that these transceiver nodes 30b which are not connected limit the area of their search for the UE 20.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining a geographic location of a user equipment via a location service server in a wireless network, comprising the steps of:
(a1) receiving, by the wireless network, a request for locating a user equipment;
(a2) determining if the user equipment is in active communication with a connected transceiver node in response to said request for locating a user equipment, requesting a connection between the user equipment and a selected transceiver node if the user equipment is not in active communication with any transceiver node, and connecting the selected transceiver node with the user equipment so that the selected transceiver node comprises a connected transceiver node;
(a) determining a value of the transmission timing delay of the user equipment;
(b) measuring a round trip time of a radio signal between the connected transceiver node and the user equipment, wherein the connected transceiver node is in active communication with the user equipment;
(c) measuring a round trip time of a radio signal between at least one other transceiver node and the user equipment, wherein the at least one other transceiver node is not in active communication with the user equipment;
(d) calculating a distance between the user equipment and the connected transceiver node and between the user equipment and each of the at least one other transceiver node using the transmission timing delay determined in said step (a); and
(e) determining the location of the user equipment using the distances calculated in said step (d).

2. The method of claim 1, wherein said step (a) comprises determining the transmission timing delay by using the connected transceiver node to query the user equipment.

3. The method of claim 1, wherein said step (a) comprises determining the transmission timing delay by setting the transmission timing delay to equal a default value $T_0$.

4. The method of claim 1, wherein said step of requesting a connection further comprises requesting, by the selected transceiver node, a return trip time measurement via a random access channel to connect the user equipment to the selected transceiver node in response to the request for locating a user equipment.

5. The method of claim 1, wherein said step (c) comprises comparing a time-of-arrival of an uplink transmission from said UE at the non-connected transceiver nodes to the time-of-arrival of the uplink transmission at the connected transceiver node, and determining the propagation time of each of the non-connected transceiver nodes therefrom.

6. The method of claim 1, wherein said step (c) further comprises determining a round trip time for at least two other transceiver nodes which are not in active communication with the user equipment.

7. The method of claim 6, wherein said step (e) comprises determining the user equipment location by mathematically generating a circle around the connected transceiver node and each of the at least two other transceiver nodes, wherein the radius of each circle is the distance of the user equipment to the respective transceiver node determined in said steps (c) and (d), and determining an intersection of the circles.

8. The method of claim 7, wherein said step of determining the intersection of the circles comprises iteratively increasing or iteratively decreasing the radii of each of the circles until an intersection point is determined.

9. The method of claim 1, wherein said step (e) comprises determining the user equipment location by mathematically generating a circle around the connected transceiver node and each of the at least one other transceiver node, wherein the radius of each circle is the distance of the user equipment to the respective transceiver node determined in said step (c) and (d), and determining an angle of arrival of radio signals used for said steps (c) and (d) at the connected transceiver node and the at least one other transceiver node.

10. The method of claim 1, wherein said step (b) further comprises determining a sector of the area of coverage of the connected transceiver node in which the user equipment is located.

11. The method of claim 10, wherein said step (c) further comprises searching, by the at least one other transceiver node, within the sector determined in said step (b).

12. The method of claim 1, wherein said steps (a)–(e) are performed in response to receiving a request for the location of a user equipment.

13. A wireless communication system comprising a core network, a plurality of radio network controllers, a plurality of wireless transceiver nodes for communicating with a user equipment located in a geographical area supported by said transceiver nodes, and a location services server for determining a location of the user equipment, said location services server comprising:

means for receiving a request for locating a user equipment;

means for determining if the user equipment is in active communication with a connected transceiver node in response to said request for locating a user equipment, requesting a connection between the user equipment and a selected transceiver node if the user equipment is not in active communication with any transceiver node, and connecting the selected transceiver node with the user equipment so that the selected transceiver node comprises a connected transceiver node;

means for determining a round trip time for a radio signal from between a user equipment and a connected transceiver node in active communication with the user equipment including means for measuring a time from a beginning of transmission of a downlink transmission signal from the connected transceiver node to the reception of an uplink transmission signal from the user equipment to the connected transceiver node in response to the downlink transmission signal;

means for determining a round trip time between the user equipment and at least one other non-connected transceiver node which is not in active communication with the user equipment;

means for determining the distance of the user equipment from the connected transceiver node and the at least one other non-connected transceiver node; and means for determining a location of the user equipment from the distances of the user equipment from each of the nodes.

14. The wireless communication system of claim 13, wherein said means for determining a round trip time between the user equipment and the at least one other non-connected transceiver node comprises means for receiving an uplink transmission signal from the user equipment at the at least one other non-connected transceiver node which is not in active communication with the user equipment and means for comparing the reception times at the at least one other non-connected transceiver node with the reception time at the connected transceiver node.

15. The wireless communication system of claim 14, further comprising means for determining an angle of arrival of transmission signals at the connected transceiver node in active communication and the at least one other transceiver node.

16. The wireless communication system of claim 14, further comprising means for determining a round trip time between the user equipment and a plurality of other non-connected transceiver nodes which are not in active communication with the user equipment.

17. The wireless communication system of claim 16, further comprising means for determining a distance of the user equipment from the connected transceiver node and from each of the plural non-connected transceiver nodes using a nominal value of a transmission timing delay of the user equipment for determining the distances of the user equipment from the transceiver nodes and mathematically generating a circle around each of the transceiver nodes, wherein a radius of each circle is the distance of the user equipment to the respective transceiver node, and wherein said means for determining a location comprises means for determining an intersection point of the circles.

18. The wireless communication system of claim 17, further comprising means for determining whether the radii determined are one of too large and too small.

19. The wireless communication system of claim 18, wherein said means for determining a location comprises means for iteratively decreasing the radii until an intersection point of the circles is found when the radii are too large and means for iteratively increasing the radii until an intersection point of the circles is found when the radii are too small.

20. The wireless communication system of claim 13, wherein said means for connecting comprises means for requesting, by the selected transceiver node, a return trip time measurement via a random access channel to connect the user equipment to the selected transceiver node in response to the request for locating a user equipment.

* * * * *